United States Patent
Miyagawa et al.

(10) Patent No.: US 7,548,362 B2
(45) Date of Patent: Jun. 16, 2009

(54) OPTICAL DEFLECTING DEVICE AND IMAGE FORMING APPARATUS USING THE SAME

(75) Inventors: Suguru Miyagawa, Yokohama (JP); Yukio Furukawa, Palo Alto, CA (US); Yasuhiro Shimada, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 11/844,738

(22) Filed: Aug. 24, 2007

(65) Prior Publication Data

US 2008/0055688 A1 Mar. 6, 2008

(30) Foreign Application Priority Data

Sep. 1, 2006 (JP) .............................. 2006-237261

(51) Int. Cl.
*G02B 26/08* (2006.01)
(52) U.S. Cl. .................................... 359/224.1; 359/872
(58) Field of Classification Search ............. 359/198.1, 359/199.1, 223.1–226.2, 290, 291, 872
See application file for complete search history.

(56) References Cited

U.S. PATENT DOCUMENTS

| 4,859,846 A | 8/1989 | Burrer |
| 5,543,956 A * | 8/1996 | Nakagawa et al. ....... 359/225.1 |
| 7,196,830 B2 | 3/2007 | Torashima et al. .......... 359/197 |
| 2006/0152785 A1 | 7/2006 | Yasuda et al. |

FOREIGN PATENT DOCUMENTS

JP  2005-208578  8/2005

\* cited by examiner

*Primary Examiner*—Euncha P Cherry
(74) *Attorney, Agent, or Firm*—Fitzpatrick, Cella, Harper & Scinto

(57) ABSTRACT

An optical deflecting device including a supporting member, an oscillating member, and a driving member for driving the oscillating member, wherein the oscillating member includes a first movable element and a second movable element torsionally oscillating about a common torsion axis, a first torsion spring for coupling the first movable element and the supporting member with each other, and a second torsion spring for coupling the first and second movable elements with each other and having a torsion axis the same as the first torsion spring, and wherein the first movable element is formed with a void configured to avoid blocking of incident light being incident on the second movable element from a direction intersecting with the torsion axis.

9 Claims, 8 Drawing Sheets

OPTICAL DEFLECTING DEVICE AND IMAGE FORMING APPARATUS USING THE SAME

FIELD OF THE INVENTION AND RELATED ART

This invention relates to an optical deflecting device and an image forming apparatus using the same. For example, this optical deflecting device can be preferably used in a projection display for projecting an image by deflection scan of light, or an image forming apparatus such as laser beam printer or digital copying machine having an electrophotographic process.

Conventionally, many types of optical scanning systems or optical scanning devices, for deflecting light by sinusoidal oscillation of a movable element having a reflection surface have been proposed, as optical deflecting devices. Optical scanning systems having a movable element performing sinusoidal oscillation have the following advantageous features as compared with optical scanning systems using a rotary polygonal mirror such as polygon mirror. That is: the size can be reduced significantly; the power consumption is slow; a movable element comprised of Si monocrystal as produced by semiconductor processes has theoretically no metal fatigue and good durability; and so on.

On the other hand, as compared with optical deflecting devices having a rotary polygonal mirror, the light reflected and deflected by a movable element performing sinusoidal oscillation has a disadvantage that the angular speed of deflection scan is unstable and it changes like a cosine curve. Particularly, as the light nears each end of the deflection scan, the angular speed of deflection scan decreases. Because of this, for applications where constant-speed scan is required upon the scanned surface, in many cases an arcsine lens is used as an image forming optical system (imaging lens). When such arcsine lens is used, as a characteristic, the F number in the main scan direction at the scan end portion changes, as compared with the scan center. This causes uneven spot diameter upon the scanned surface, between the scan central portion and the scan end portion.

As an improvement to overcome the problem mentioned above, U.S. Pat. No. 4,859,846 proposes the following technique. FIG. 11 is a schematic diagram of an optical deflecting device disclosed in U.S. Pat. No. 4,859,846. This optical deflecting device comprises movable elements 14 and 16, a torsion spring 18 for coupling them together and providing elastic support to them, and torsion springs 20 for providing elastic support to the movable element 16 and a mechanical ground surface 24. All of these elements are torsionally oscillated by a driving member at 22 and 23 (rotator 22 and stator 23) about a torsional axis 26. Furthermore, the movable element 14 has a reflection surface for deflecting light and, through torsional oscillation of the movable element 14, it deflectively scans the light from the light source. With respect to torsional oscillation around the torsion axis 26, this optical deflecting device has a primary natural oscillation mode that provides a reference frequency and a secondary natural oscillation mode that provides a frequency approximately threefold the reference frequency.

The driving member 22 and 23 drives the optical deflecting device in accordance with the two frequencies, that is, the frequency of the primary natural oscillation mode and the frequency of the same phase but being threefold the former. Thus, the optical deflecting device produces torsional oscillation according to the primary natural oscillation mode and, in addition to this, the secondary natural oscillation mode, at once. As a result, the displacement angle of the deflection scan of light reflected by the movable element 14 is based on superposition of these two oscillation modes, and it changes like approximately chopping waves, not sinusoidal waves. Hence, as compared with a case where the displacement angle changes like sinusoidal waves, there is a wide region in which the angular speed of deflection scan is approximately constant. Thus, a larger portion of the whole range can be used for the deflection scan.

On the other hand, U.S. Patent Application Publication No. 2006/0152785 proposes an optical deflecting device having a primary natural oscillation mode that provides a reference frequency and a secondary natural oscillation mode that provides a frequency approximately twofold the reference frequency. FIG. 12 is a schematic diagram showing the optical deflecting device disclosed in this patent document. This optical deflecting device is arranged to solve the problem that not only a torsional oscillation but also an oscillation mode of flexure are easily produced when movable elements 31 and 32 are coupled to torsion springs 33 and 34 in series so as to movably support them with a support member 35. To this end, as shown in FIG. 12, a movable element having a secondary natural oscillation mode that provides a frequency approximately twofold the reference frequency is made integral.

SUMMARY OF THE INVENTION

Now, in FIG. 12, the incidence of light which goes along a plane 36, perpendicularly intersecting with the torsion spring 34 and intersecting with the surface of the second movable element 32 as the same is stationary, and which is incident on the reflection-surface side of the second movable element 32 will be referred to as "crosswise oblique incidence". When the light is incident by this crosswise oblique incidence and if the incidence angle is $\theta_{in}$ ($0<\theta_{in}<90$ deg.), a portion of the incident light may be blocked by the first movable element 31 oscillating simultaneously with the second movable element 32.

In consideration of this, light may be incident along a direction perpendicular to the surface of the second movable element 32 as the same is stationary, onto the reflection-surface side of the second movable element 32 (hereinafter, this will be referred to as "normal incidence"). This avoids eclipse of incident light by the first movable element 31.

However, in such normal incidence, it would be necessary to use one piece of half mirror to put the light source for the light emission outside the light scan region. As a result, in the normal incidence, as compared with crosswise oblique incidence, a larger cost is required and the optical deflecting device becomes bulky.

In accordance with an aspect of the present invention, there is provided an optical deflecting device, comprising: a supporting member; an oscillating member; and a driving member for driving said oscillating member, wherein said oscillating member includes a first movable element and a second movable element torsionally oscillating about a common torsion axis, a first torsion spring for coupling said first movable element and said supporting member with each other, and a second torsion spring for coupling said first and second movable elements with each other and having a torsion axis the same as said first torsion spring, and wherein said first movable element is formed with a void configured to avoid blocking of incident light being incident on said second movable element from a direction intersecting with said torsion axis.

In accordance with another aspect of the present invention, there is provided an optical deflecting device, comprising: a supporting member; an oscillating member; and a driving member for driving said oscillating member, wherein said oscillating member includes a first movable element and a second movable element torsionally oscillating about a single torsion axis, a first torsion spring for coupling said first movable element and said supporting member with each other, and a second torsion spring for coupling said first and second movable elements with each other, wherein said first torsion spring and said second torsion spring are disposed along a single straight line, and wherein said first movable element is formed with one of (i) a void which extends from a side near said torsion axis to a side remote from said torsion axis and totally penetrates a material of said first movable element to define a apace and (ii) a void which defines a space while leaving there a part of the material at the side remote from said torsion axis, said first movable element being disposed to surround said second movable element.

In accordance with a further aspect of the present invention, there is provided an image forming apparatus, comprising: a light source; an optical deflecting device including (i) a supporting member, (ii) an oscillating member and (iii) a driving member for driving said oscillating member, wherein said oscillating member includes a first movable element and a second movable element torsionally oscillating about a common torsion axis, a first torsion spring for coupling said first movable element and said supporting member with each other, and a second torsion spring for coupling said first and second movable elements with each other and having a torsion axis the same as said first torsion spring, and wherein said first movable element is formed with a void configured to avoid blocking of incident light being incident on said second movable element from a direction intersecting with said torsion axis; and a photosensitive member, wherein said light source is so disposed that light is incident on a reflection surface of said second movable element, from a side where said void of said first movable element is present, and wherein said optical deflecting device deflects the light from said light source so that at least a portion of the light is incident on said photosensitive member thereby to produce an electrostatic latent image on said photosensitive member.

In accordance with the present invention, a first movable element disposed to surround a second movable element having a reflection surface is formed with a void such as described above. This enables crosswise oblique incidence of light while avoiding blocking of incident light by the first movable element, regardless of a large incidence angle. Thus, in this optical deflecting device, light can be incident on the second movable element having a reflection surface, without the necessity of using a half mirror.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
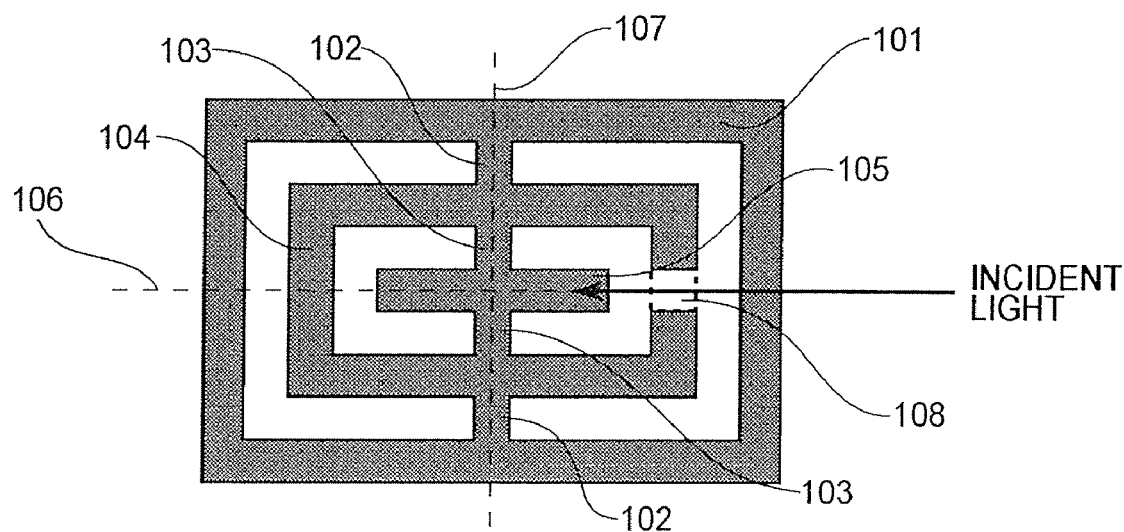
FIG. 1A and FIG. 1B are diagrams for explaining an optical deflecting device according to a first embodiment of the present invention.

Preferred embodiments of the present invention will now be described with reference to the attached drawings.

First Embodiment

Referring to FIG. 1-FIG. 5, an optical deflecting device according to a first embodiment of the present invention will be explained. FIG. 1A is a top plan view of the optical deflecting device of the present embodiment, and FIG. 1B is the sectional view of it. As shown in FIG. 1A and FIG. 1B, the optical deflecting device of the present embodiment comprises two movable elements 104 and 105 and two types of torsion springs 102 and 103 placed along a straight line (on a torsion axis 107), for coupling the two movable element 104 and 105 with each other, in series. These torsion springs have a common torsion axis. The two movable elements include a second movable element 105 of rectangular shape, having a reflection surface formed in the central portion thereof, and a first movable element 104 which constitutes an outer frame member of rectangular-frame shape, being placed to surround the reflection surface.

Here, a portion of the first movable element 104 extending in parallel to the torsion axis 107 is partly removed to define a void 108. The void 108 extends from a side near the torsion axis 107 of the two types of movable elements 102 and 103 to a side remote from the torsion axis, to define a space that totally penetrates the material of the first movable element. In other words, the first movable element has formed with a void configured to avoid blocking of the incident light being incident on the second movable element from a direction intersecting with the torsion axis. The optical deflecting device of the present embodiment further comprises a driving member for driving the second movable element 105 having a reflection surface. The structure of the driving member is shown in FIG. 1B.

More specifically, as shown in FIG. 1A, the second movable element 105 having a reflection surface is supported with the two second torsion springs 103 which are disposed opposed to each other with the second movable element sandwiched therebetween. The first movable element 104 supports the two second torsion springs 103 inside of it. The first movable element 104 is supported with the two first torsion springs 102 disposed opposed to each other with the first movable element placed therebetween. A supporting member 101 supports the two first torsion springs 102 inside of it.

Because the first movable element 104 has the void 108, when a plane 106 perpendicular to the torsion axis 107 and intersecting with the second movable element 105 is defined there, this plane 106 intersects with only a portion of the first movable element 104 which is on the opposite side of the void 108 across the torsion axis 107.

Figure 1B:
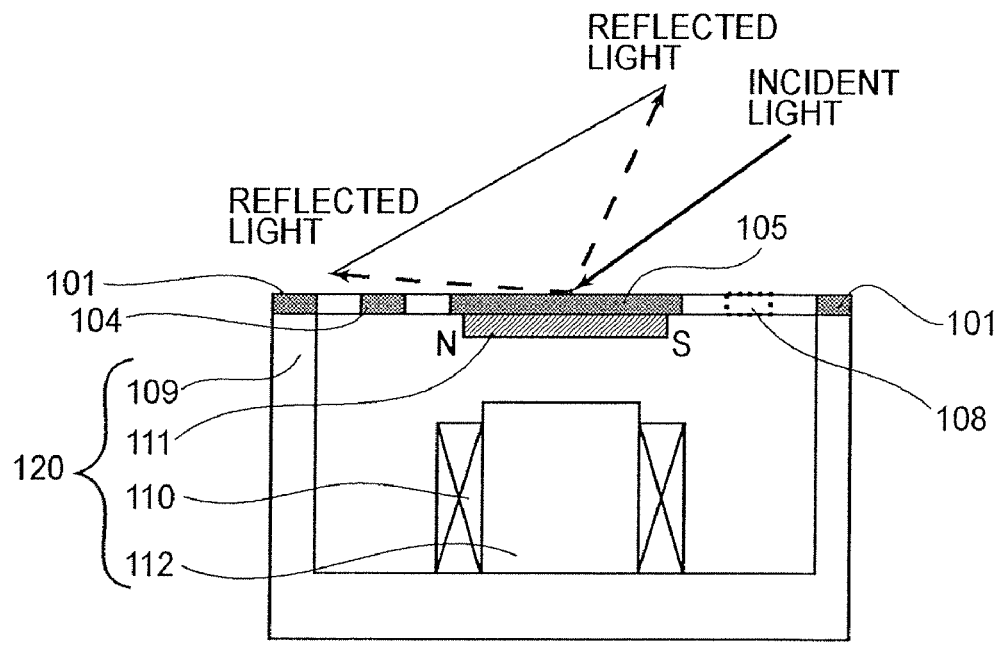

FIG. 1A and FIG. 1B show crosswise oblique incidence of light upon the second movable element 105, the light being incident along the plane 106 and from a side where the void 108 is present. Because the void 108 intersects with the plane 106 as illustrated, if the light is incident by crosswise oblique incidence from the side with the void 108, blocking of incident light by the first movable element 104 can be avoided. As regards means for forming the void 108 for this crosswise light oblique incidence, an example is a laser beam machining process wherein a laser beam is projected to a portion for forming a void 108, to remove the material thereat to thereby define the void 108. Alternatively, an oscillation system having a first movable element 104 with such void 108 may be fabricated beforehand.

Referring to FIG. 1B, a driving member for driving the second movable element 105 will be explained. FIG. 1B shows the section having been cut along the plane 106 of FIG. 1A. A light reflecting film is bonded to the top surface of the second movable element 105, and a permanent magnet 111 is bonded to the undersurface. The supporting member 101 is bonded to a yoke 109 which is made of a high permeability material. There is a core 112 made of a high permeability material, which is disposed at a portion of the yoke 109 opposed to the permanent magnet 111. An electric coil 110 is wound around the core 112. The permanent magnet 111, electric coil 110, core 112 and yoke 109 constitute an electromagnetic actuator 120. When the electric coil 110 is electrified, torque acts on the permanent magnet 111 to cause oscillation of the second movable element 105. Here, the permanent magnet 111 may be bonded to the undersurface of first movable element 105 rather than the second movable element 105, or it may be bonded to both of the movable elements. If the second movable element 105 is not provided with the permanent magnet 111, the surface smoothness of the light reflecting film can be secured better.

An example of driving principle of the optical deflecting device having the structure described above will be explained. With regard to the torsional oscillation around the torsion axis, the oscillating member of this optical deflecting device can be treated as a two-degrees-of-freedom oscillation system having a primary natural oscillation mode of frequency $f_0$ that provides a reference frequency, and a secondary natural oscillation mode of a frequency approximately twofold the reference frequency. The electromagnetic actuator 120 including the electric coil 110 shown in FIG. 1B can drive the oscillating member of the optical deflecting device in accordance with the two frequencies, that is, the frequency of this primary natural oscillation mode and the frequency of the same phase but approximately twofold of the reference frequency.

Figure 3:
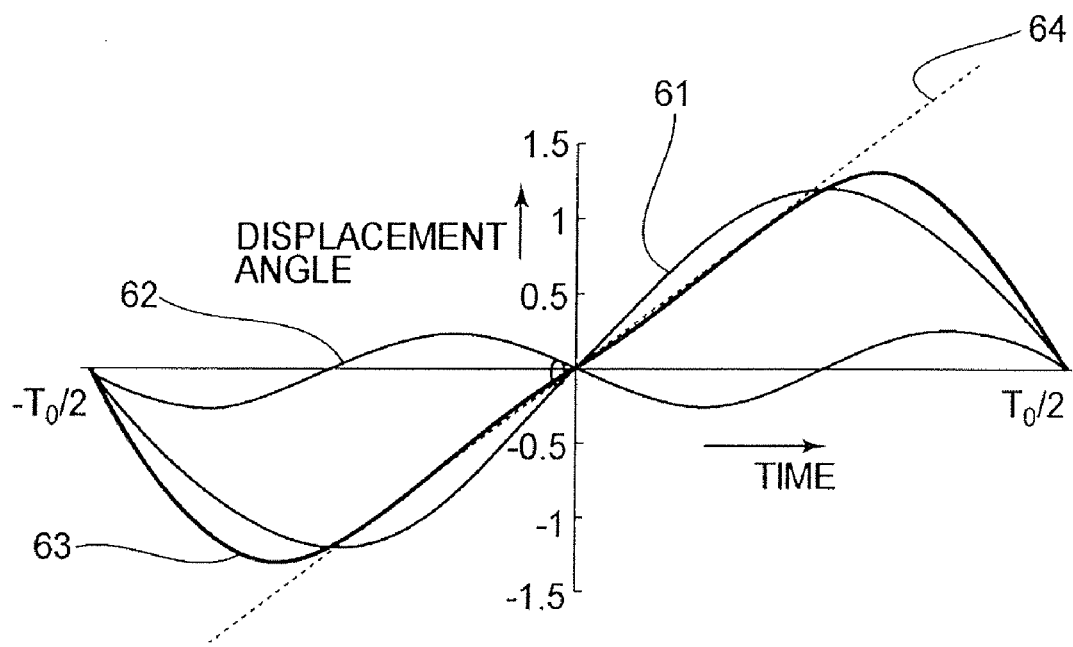
FIG. 3 is a graph for explaining the displacement angle of light deflected and scanned by the optical deflecting device of the first embodiment.

The driving principle will be explained in greater detail. FIG. 3 is a diagram for explaining the displacement angle of torsional oscillation of a frequency $f_0$ of the second movable element 105, taking time t on the axis of abscissas. In this specification, since the displacement angle of reciprocal oscillation of the movable element differs from the displacement angle of light deflected and scanned by the optical deflecting device only with respect to the constant part, these are treated as equivalent. FIG. 3 specifically shows a portion corresponding to one period of $T_0$ of the torsional oscillation of the second movable element 105 ($-T_0/2 < X < T_0/2$).

A curve 61 shows the component of the reference frequency $f_0$ of the driving signal for driving the electric coil 110. It is sinusoidal oscillation, reciprocally oscillating in the range of maximum amplitude $\pm\phi_1$ and presented by Equation (1) below, with time t and angular frequency $w_0 = 2\pi f_0$.

$$\theta_1 = \phi_1 \sin[W_0 t] \quad (1)$$

On the other hand, curve 62 shows the frequency component which is twofold the reference frequency f0. It is sinusoidal oscillation which oscillates in the range of maximum amplitude $\pm\phi_2$ and is presented by Equation (2) below.

$$\theta_2 = \phi_2 \sin[2W_0 t] \quad (2)$$

Curve 63 shows the displacement angle of the torsional oscillation of the second movable element 105 caused as a result of such drive. The optical deflecting device has a natural oscillation mode of frequency $f_1$ and a secondary natural oscillation mode of frequency $f_2$ with respect to the torsional oscillation about the torsion axis 107, being adjusted to the reference frequency $f_0$ and the twofold frequency around $2f_0$, respectively. Therefore, resonances are activated by these driving signals $\theta_1$ and $\theta_2$ within the optical deflecting device. In other words, the displacement angle of the second movable element 105 shown by curve 63 will be oscillation based on superposition of these two sinusoidal oscillations, that is, sawtooth-wave vibration that can be presented by Equation 3 below.

$$\theta = \theta_1 + \theta_2 = \phi_1 \sin[w_0 t] + \phi_2 \sin[2w_0 t] \quad (3)$$

Figure 4:
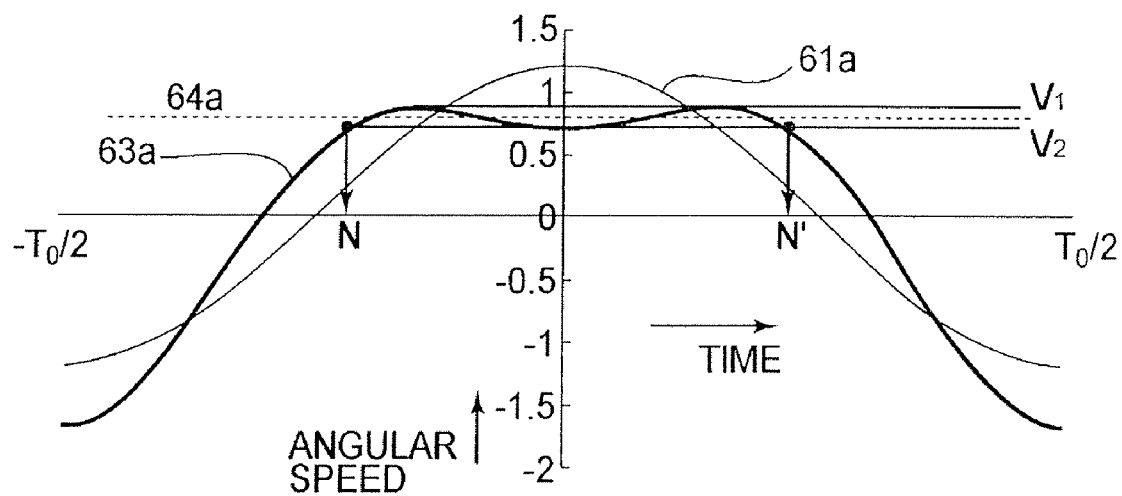
FIG. 4 is a graph for explaining the angular speed of light deflected and scanned by the optical deflecting device of the first embodiment.

FIG. 4 shows curves 61a and 63a and a straight line 64a, obtained by differentiating the curves 61 and 63 and straight line 64 of FIG. 3, and illustrating the angular speeds of these curves. It is seen that, as compared with the curve 61a which shows the angular speed of the sinusoidal oscillation of reference frequency $f_0$, in the curve 63a showing the angular speed of the sawtooth-wave-like reciprocal oscillation of the second movable element 105, in the section N-N' the angular speed fits into the range taking the angular speed $V_1$ of the maximum point as a maximum and taking the angular speed $V_2$ of the minimum point as a minimum. Thus, if in an application using the deflection scan of light by the optical deflecting device the angular speeds $V_1$ and $V_2$ are within an allowable error range of angular speed from the straight line 64a depicts the constant angular-speed scan, the section N-N' can be regarded as being substantially equiangular scan. As described above, due to the sawtooth-wave-shaped reciprocal oscillation, the region where the angular speed of deflection scan can be regarded as being substantially constant can be widened as compared with that obtainable with sinusoidal-wave displacement angle. Hence, the effectively available region relative to the whole deflection scan range can be enlarged.

The foregoing description has been made with reference to an example wherein two natural oscillation modes have an approximately twofold-frequency relationship. If an approximately threefold relationship is there, the superposed oscillation would have an approximately chopping wave form. In this case, since an approximately constant angular-speed region appears during the forward and backward strokes of deflection scan, it will be particularly suitable for the application utilizing the constant angular-speed in the reciprocation.

Figure 2A:
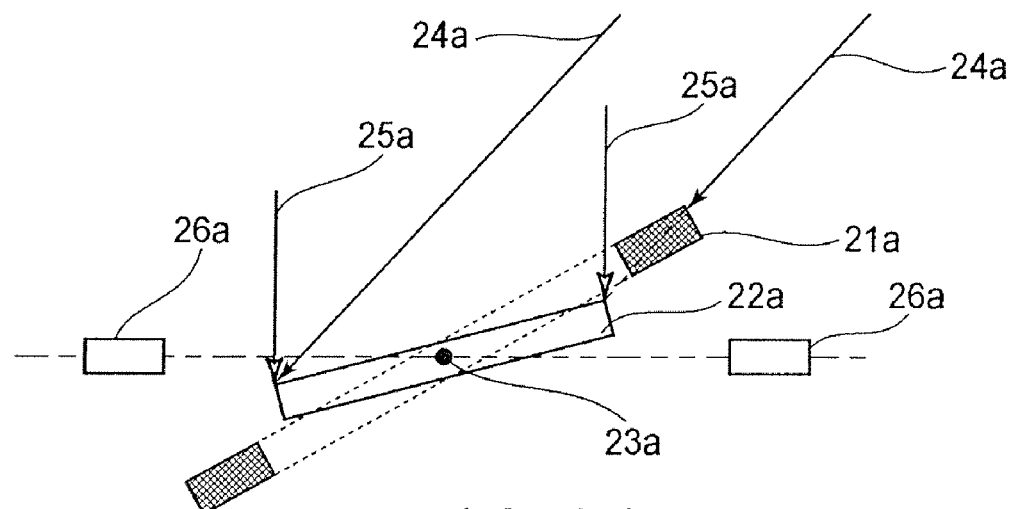
FIG. 2A-FIG. 2C are diagrams for explaining advantageous features of the invention, specifically in relation to the first embodiment thereof.
Figure 2B:
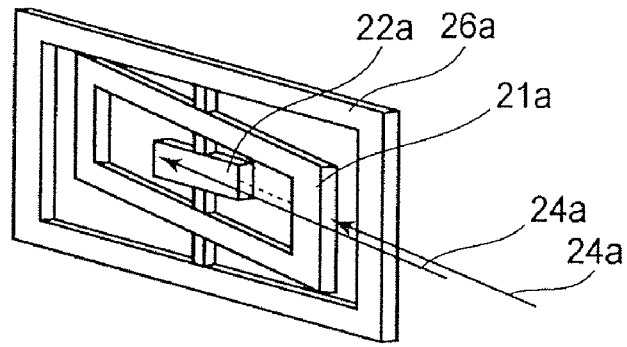
Figure 2C:
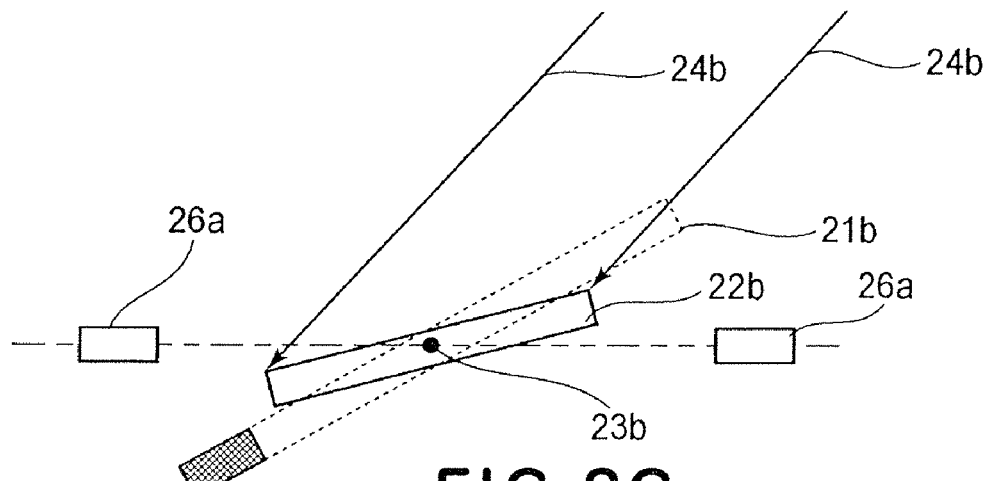

Here, while comparing with an optical deflecting device of conventional example, the range of incidence angle of light for assuring crosswise oblique incidence in the optical deflecting device according to the present embodiment will be explained. FIG. 2A and FIG. 2C are sectional views of two types of optical deflecting devices, respectively, taken along a plane (equivalent to the plane 106) perpendicular to the torsion axis 23a or 23b and intersecting with the second movable element 22a or 22b. FIG. 2A shows an optical deflecting device of conventional example, and FIG. 2B is a perspective view of the optical deflecting device of FIG. 2A. FIG. 2C shows an optical deflecting device according to the present embodiment.

In the optical deflecting device of FIG. 2A, when the second movable element 22a torsionally oscillates, the first movable element 21a as well torsionally oscillates. Here, the incident light 24a being incident by crosswise oblique incidence inclined more than a certain degree may be blocked by the first movable element 21a which is being torsionally oscillated. FIG. 2A and FIG. 2B show this. Note that in FIG. 2A and FIG. 2B denoted at 26a is a supporting member, and denoted at 25a is the light of normal incidence.

As compared therewith, in the optical deflecting device of the present embodiment shown in FIG. 2C, when the second movable element 22b and first movable element 21b oscillate, the incident light 24b by crosswise oblique incidence is not blocked by the first movable element 21b.

Figure 5:
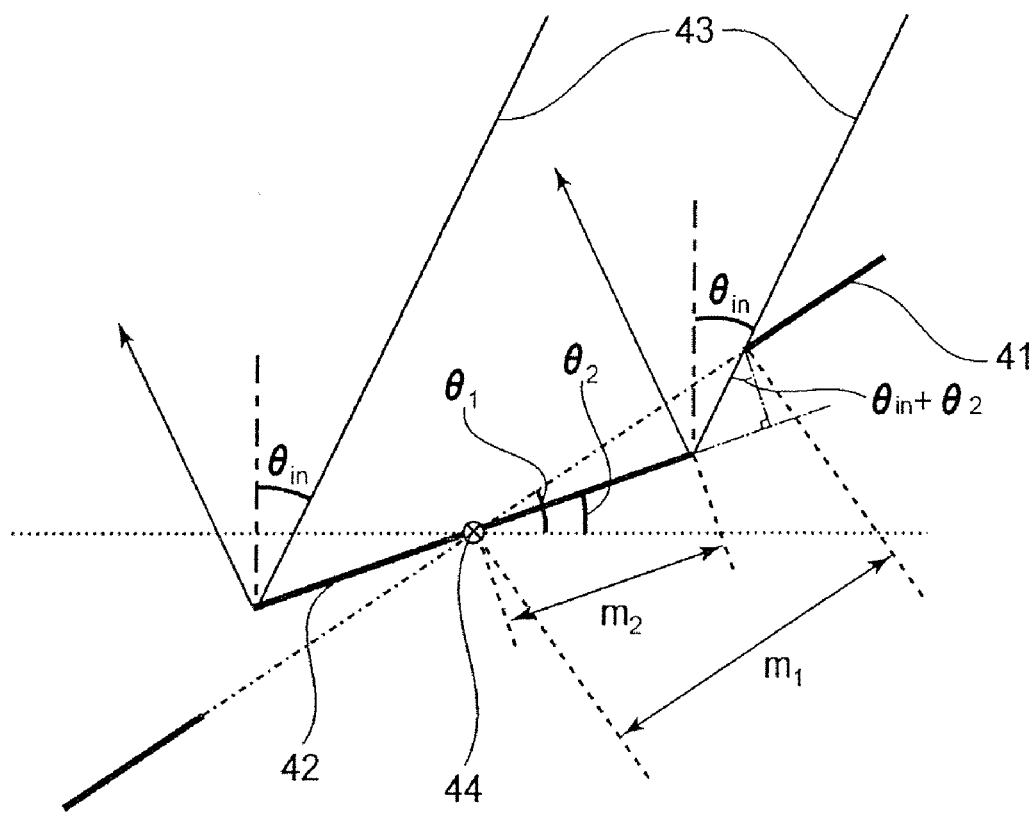
FIG. 5 is a diagram for explaining eclipse of incident light by a first movable element, in an optical deflecting device according to a conventional example.
Figure 12:
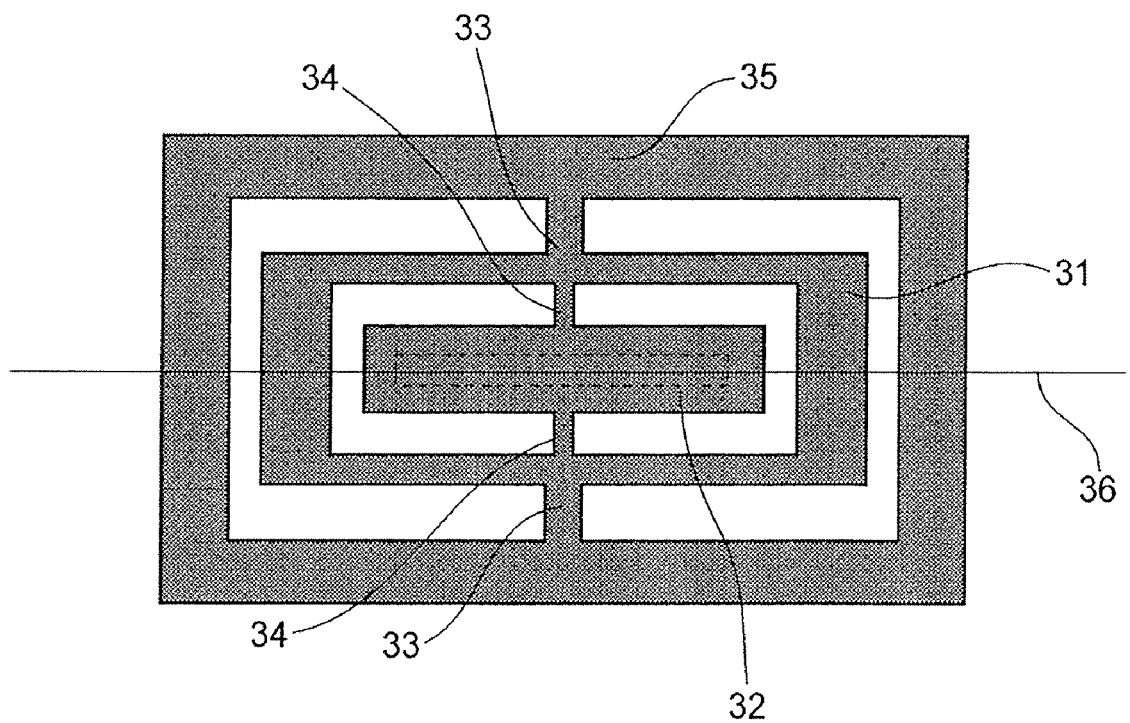
FIG. 12 is a diagram for explaining an optical deflecting device of another conventional example.

The angle of oblique incidence light not to be blocked by the first movable element that surrounds the second movable element will now be explained. FIG. 5 is sectional view taken along the plane 36 of the optical deflecting device in the conventional example of FIG. 12. Here, the first movable element 41 and the second movable element 42 are illustrated as being torsionally oscillating with a certain mechanical deflection angle. Now, the dimension of each part at the plane 36 that contains obliquely incident light 43 will be designated by the following symbols:

$\theta_1$ denotes the mechanical deflection angle of the first movable element 41 ($0<\theta_1<90$ degrees);

$\theta_2$ denotes the mechanical deflection angle of the second movable element 42 ($0<\theta_2<90$ degrees);

$\theta_{in}$ denotes the incidence angle of light 43 when crosswise oblique incidence is made ($0<\theta_{in}<90$ degrees);

$m_1$ denotes the smallest width to the inner end of the first movable element 41 when the torsion axis is taken as a reference; and $m_2$ denotes the largest width up to the outer end of the second movable element 42 when the torsion axis 44 is taken as a reference ($m_1>m_2$).

In this case, unless the incidence angle $\theta_{in}$ is so set as to satisfy Equation (4) below, the phenomenon that the obliquely incident light 43 is blocked by the material of the first movable element 41 results.

$$\tan(\theta_2 + \theta_{in}) < \frac{m_1\cos(\theta_1 - \theta_2) - m_2}{m_1\sin(\theta_1 - \theta_2)} \quad (4)$$

However, in the optical deflecting device of the present embodiment, $m_1$ becomes infinite in Equation (4) since the void such as described above is formed in the first movable element. Thus, Equation (4) applies within the range of $0<\theta_{in}<90$ degrees, and crosswise oblique incidence of light with a flexible angle is assured.

As described above, when an optical deflecting device of the present embodiment is used, crosswise oblique incidence of light can be performed with a large degree of freedom, which has been difficult to accomplish with conventional resonance type optical deflecting devices. As a result of this, use of a half mirror becomes unnecessary. Therefore, the cost becomes comparatively low, and the optical deflecting device can be downsized.

Although the void extends from the side near to the torsion axis 107 to the side remote from the same and it totally penetrates the material, the void may be so formed as to provide a space while leaving some material at the side remote from the torsion axis 107. With such structure (that means ml in Equation (4) is enlarged), the range that satisfies Equation (4) concerning the incidence angle $\theta_{in}$ of crosswise oblique incidence of the light is widened, such that the degrees-of-freedom thereof can be enlarged to some extent. As a further alternative, an additional void may be provided at a side of the torsion axis 107 remote from the original void, thereby to assuredly avoid that the light reflected by the reflection surface of the second movable element is eclipsed by the first movable element. In that occasion, if the void at the light incidence side comprises a void which totally penetrates the material, then the additional void at the other side must be a void defined by leaving some material at the side remote from the torsion axis 107. If the void at the light incidence side comprises a void defined by leaving some material at the side remote from the torsion axis 107, the additional void at the other side may be either a void which totally penetrates the material or a void having some material left there.

Furthermore, there may be plural first movable elements provided to surround the second movable element having a reflection surface. In that case, all the first movable elements should have a void such as described above. Except the void of the outermost one of the first movable elements surrounding the reflection surface, all the voids should be one totally penetrating the material.

Although in this embodiment the movable elements have a rectangular shape or rectangular-frame shape, these may have a circular shape, a circular-frame shape, a polygonal shape or polygonal-frame shape, for example. Any appropriate shapes may be used in accordance with the requirement. An example is that: the first movable element has a polygonal-frame shape having at least one portion extending in parallel to the torsion axis, while the void is formed by totally or partly removing that portion of the first movable element of polygonal-frame shape which extends in parallel to the torsion axis. In that case, it is preferable that the crosswise oblique incidence light to the second movable element having a reflection surface is incident along a direction perpendicular to the torsion axis or the portion of the first movable element extending in parallel to the torsion axis. This is what is actually done in the above-described embodiment and the embodiment to be described later.

Furthermore, although in the present embodiment the movable element is supported for torsional oscillation by means of plural torsion springs, it may be supported for torsional oscillation by means of a single torsion spring.

Furthermore, although the driving member is comprised of an electromagnetic actuator which applies torque to at least one of the first and second movable elements to drive the oscillating member, it may be comprised of means for driving the movable element electrostatically, or it may be comprised of means for driving the movable element by use of a piezoelectric element.

Second Embodiment

Figure 6:
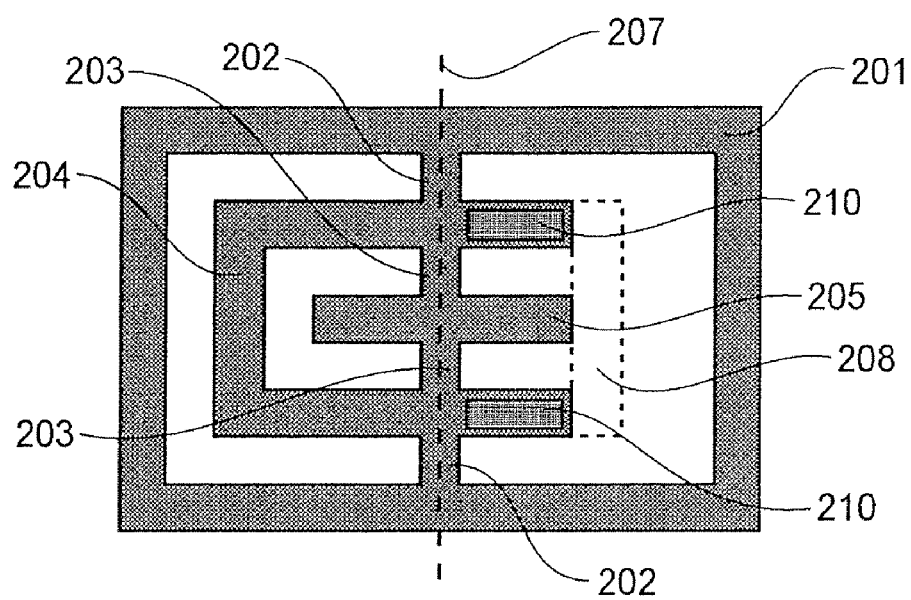
FIG. 6 is a top plan view for explaining an optical deflecting device according to a second embodiment of the present invention.

FIG. 6 is a top plan view showing the structure of a second embodiment. In the present embodiment, two weights 210 for adjusting the moment of inertial are added to a first movable element 204 at the side (with reference to a plane extending through a torsion axis 207 and perpendicularly intersecting with a second movable element 207) where a void 208 for crosswise light oblique incidence is present. With this structure, the moment of inertia around reduced torsion axis 207 at the void 208 side, having been reduced by the provision of the void 208 for crosswise light oblique incidence, is complemented. In this example, the void 208 is defined by a space that extends from the side near a torsion axis 207 of two types of torsion springs 202 and 203, supported respectively by a supporting member 201 and a first movable element 204, and that totally penetrates the material, the void 208 thus being formed in a wide range along the torsion axis 207. More specifically, in the first movable element 204 of the rectangular-frame shape surrounding the second movable element 205 of rectangular shape, void 208 is formed by totally removing a portion of the first movable element 204 that extends in parallel to the torsion axis 207. The structure of the remaining portion is the same as the first embodiment.

Figure 7A:
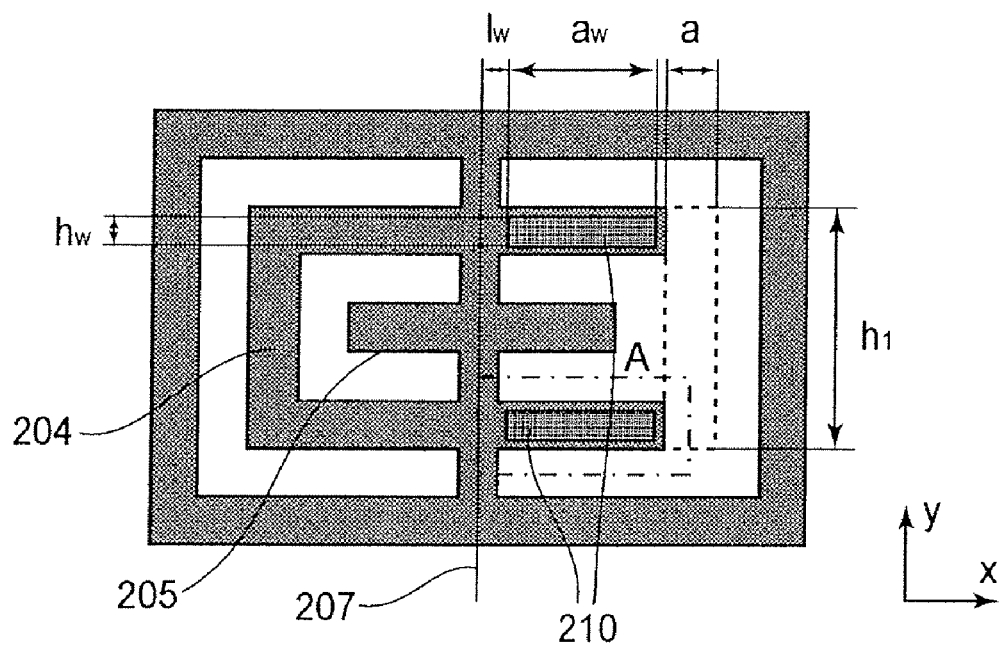
FIG. 7A and FIG. 7B are diagrams for explaining the optical deflecting device of the second embodiment.
Figure 7B:
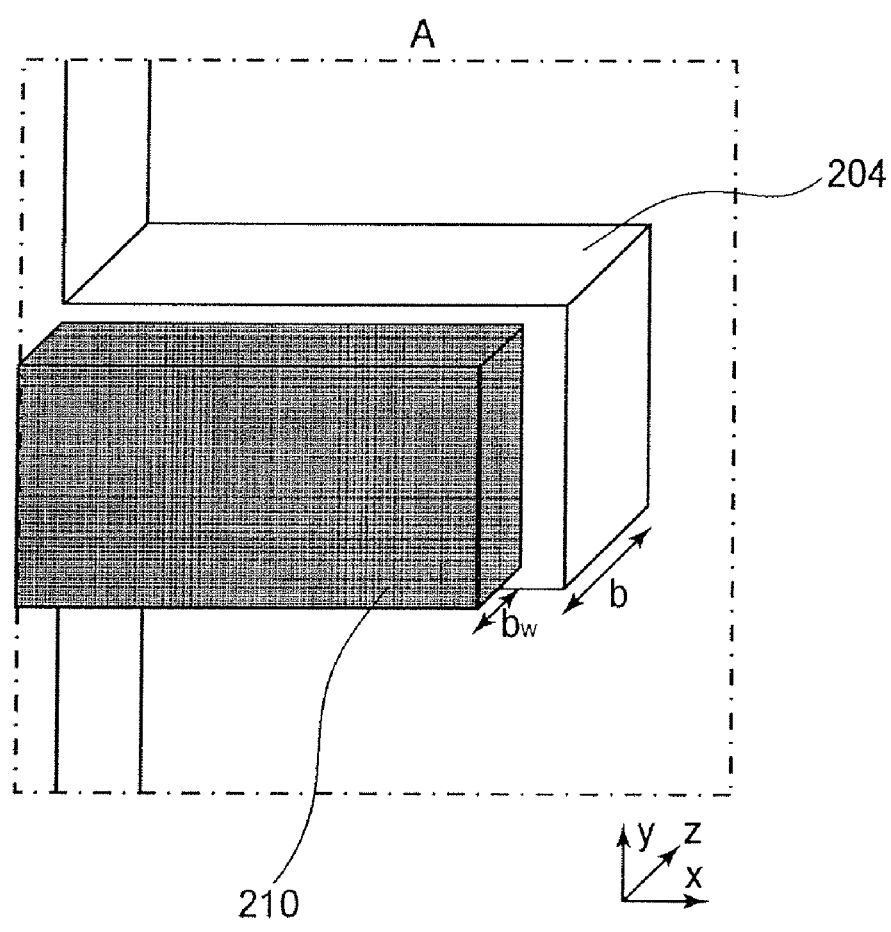

Next, equations for determining the size of the weight 210 for inertia moment adjustment will be described. FIG. 7B is a perspective view of the dotted-line portion A of FIG. 7A. Here, in FIG. 7A and FIG. 7B, symbols are assigned as follows:

$a_w$ denotes the x-direction length of the weight 210 for inertia moment adjustment;
$h_w$ denotes the y-direction length of it;
$b_w$ denotes the z-direction thickness of it;
$a$ denotes the x-direction length of the void 208 for crosswise light oblique incidence;
$h_1$ denotes the y-direction length of it;
$b$ denotes the z-direction thickness of it;
$l_w$ denotes the length from the axis 207 to the weight 210 for inertia moment adjustment;
$\rho$ denotes the density of silicon;
$\rho_w$ denotes the density of the weight 210;
$I_1$ denotes the moment of inertia of any material, on condition that there is such material at the void 208 for crosswise light oblique incidence; and
$I_w$ denotes the moment of inertia of the weight 210 for inertia moment adjustment.

Here, two equations in Equation (5) below apply.

$$I_1 = abh_1\rho\left(\frac{a^2}{3} + al + l^2 + \frac{b^2}{12}\right) \quad (5)$$

$$I_w = 2a_w b_w h_w \rho_w\left(a_w l_w + l_w^2 + \frac{a_w^2}{3} + \frac{b_w}{3} + \frac{bb_w}{2} + \frac{b^2}{4}\right)$$

Here, if the two equations of formula 5 are supposed to be equal, the inertia moments on both sides of this axis 207 of first movable element 204 can be equalized around the torsion axis 207. For example, assuming that $h_w$, $b_w$ and $\rho_w$ are constants, if $a_w$ when $I_1=I_w$ is satisfied is obtained, the size of the inertia moment adjusting weight 210 can be determined.

As described above, by equalizing the inertia moments at both sides of the first movable element 204 while taking, as a reference, the plane extending through the torsion axis 207 and perpendicularly intersecting with the second movable element 205, stable torsional oscillation is enabled and oscillatory fluctuation is controlled.

Third Embodiment

Figure 8:
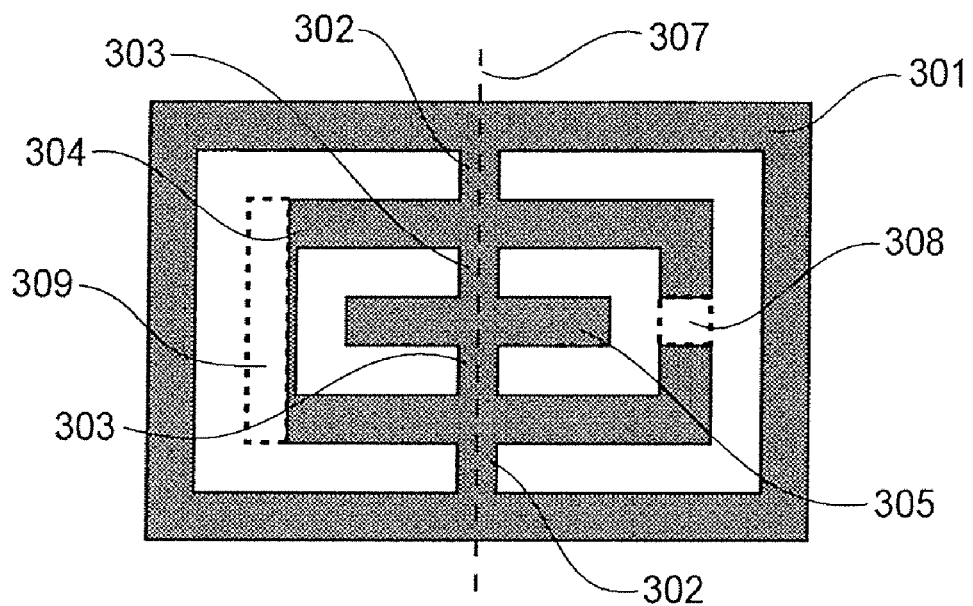
FIG. 8 is a top plan view for explaining an optical deflecting device according to a third embodiment of the present invention.

FIG. 8 is a top plan view showing the structure of a third embodiment. In the present embodiment as well, a void 308 for crosswise light oblique incidence is formed in the first movable element 304. In addition to this, at a side remote from the void 308, there is an additional void 309 for inertia moment adjustment which is formed by partly removing a portion of the first movable element 304, to ensure that the first movable element 304 have equalized inertia moments with reference to a plane that extends through a torsion axis 307 and perpendicularly intersecting with a second movable element 305. Also in this example, by means of two types of torsion springs 302 and 303 supported by a supporting member 301 and the first movable element 304, respectively, the first movable element 304 and the second movable element 305 are supported for oscillation. The structure of the remaining portion is the same as the first embodiment. However, in the first movable element of this example, the space totally penetrates and extends only with the presence of the void 308 for crosswise light oblique incidence, and the material is interrupted there.

Figure 9:
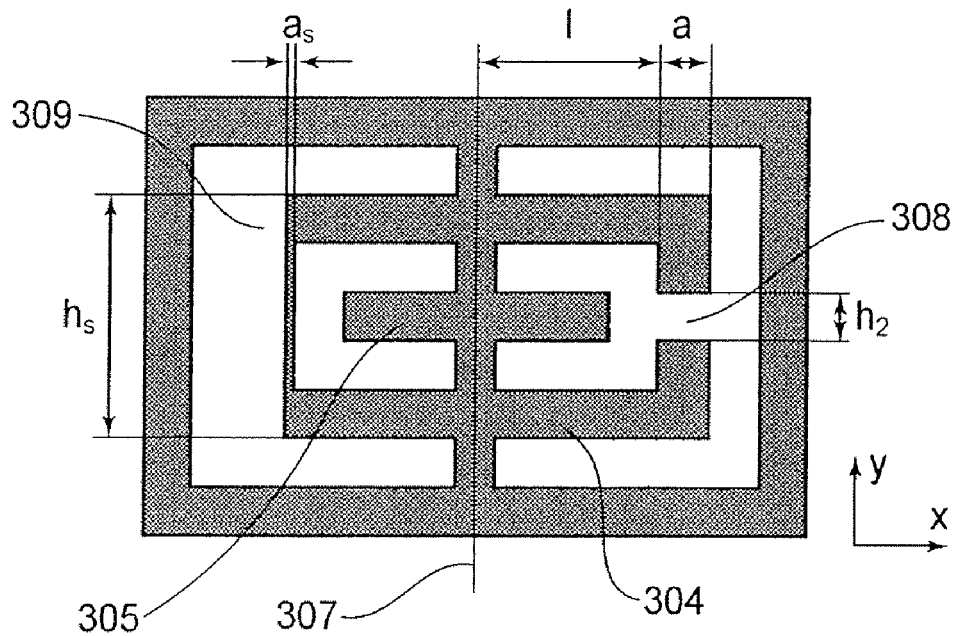
FIG. 9 is a diagram for explaining the optical deflecting device of the third embodiment.

Next, equations for determining the size of the void 309 for inertia moment adjustment will be described. In FIG. 9, symbols are assigned as follows:

$a$ denotes the x-direction length of the void 308 for crosswise oblique incidence of light;
$h_2$ denotes the y-direction length of it;
$l$ denotes the length from the axis 307 to the void 308 for crosswise light oblique incidence;
$b$ denotes the z-direction thickness of it (see FIG. 7B);
$\rho$ denotes the density of silicon;
$a_s$ denotes the x-direction length of the void 309 for inertia moment adjustment;
$h_s$ denotes the y-direction length of it;
$I_2$ denotes the moment of inertia of any material, on condition that there is such material at the void 308 for crosswise light oblique incidence; and
$I_s$ denotes the moment of inertia of any material, on condition that there is such material at the void 309 for inertia moment adjustment.

Here, two equations in Equation (6) below apply.

$$I_2 = abh_2\rho\left(\frac{a^2}{3} + al + l^2 + \frac{b^2}{12}\right) \quad (6)$$

$$I_s = a_s bh_s\rho\left\{\frac{a_s^3}{3} + \frac{(l+a)a_s}{3} + \frac{(l+a)^2}{3} + \frac{b^2}{12}\right\}$$

Here, if the two equations in Equation (6) are supposed to be equal, the inertia moments on both sides of this axis 307 of the first movable element 304 can be equalized around torsion axis 307. For example, assuming that $h_s$ is a constant, if $a_s$ when $I_1=I_s$ is satisfied is obtained, the size of the inertia moment adjusting void 309 can be determined.

In this embodiment as well, as described above, by equalizing the inertia moments at both sides of the first movable element 304 while taking, as a reference, the plane extending through the torsion axis 307 and perpendicularly intersecting with the second movable element 305, stable torsional oscillation is enabled and oscillatory fluctuation is controlled.

Furthermore, the air resistance applied to the first movable element 304 reduces because of the decrease of the area of the first movable element 304. Hence, the oscillatory fluctuation is suppressed more.

Fourth Embodiment

Figure 10:
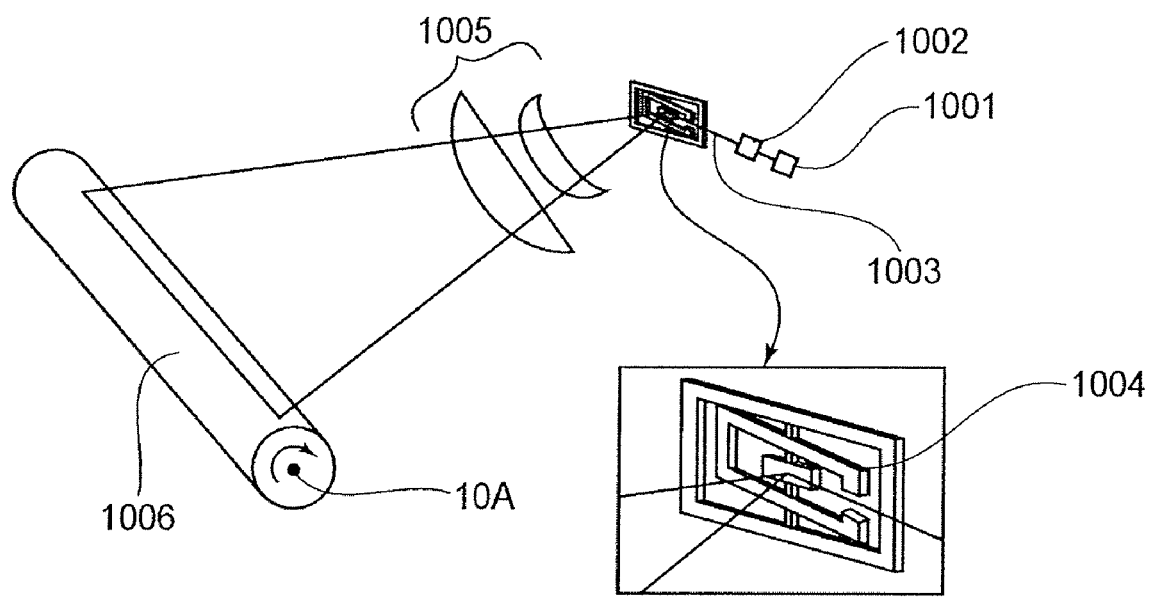
FIG. 10 is a diagram for explaining an image forming apparatus according to a fourth embodiment of the present invention.
Figure 11:
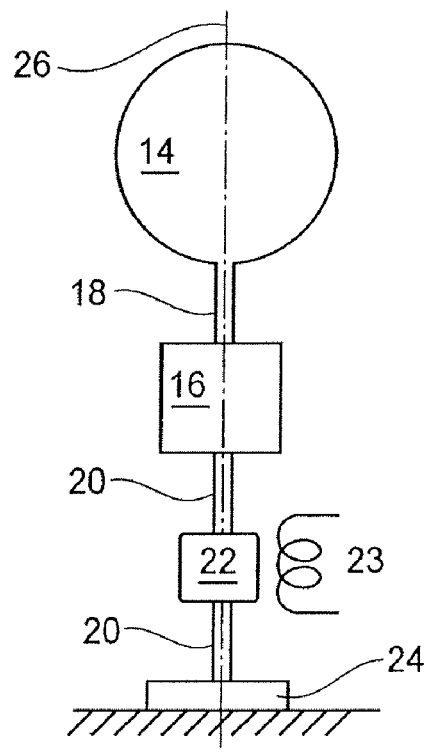
FIG. 11 is a diagram for explaining an optical deflecting device of a conventional example.

FIG. 10 is a perspective view showing a basic structure of an image forming apparatus according to a fourth embodiment, which concerns an optical equipment using an optical deflecting device of the present invention. In FIG. 10, denoted at 1001 is laser source, and denoted at 1002 is a lens. Denoted at 1005 is a writing lens, and denoted at 1006 is a drum-shaped photosensitive member. Disposed between the writing lens 1005 and the lens 1002 is an optical deflecting device 1004. For the optical deflecting device 1004, an optical deflecting device having been described with reference to the foregoing examples can be used.

The image forming apparatus of the present embodiment functions as a light scanner device for scanning the light with the optical deflecting device 1004, in one-dimensional direction parallel to the rotation center 10A of the drum-shaped photosensitive member 1006. That is, the laser beam 1003 emitted from a laser source 1001 passes through a lens 1002 and it is scanned by the optical deflecting device 1004 one dimensionally. On the other hand, the drum-shaped photosensitive member 1006 rotates around center of rotation 10A at a constant speed. Since the surface of the drum-shaped photosensitive member 1006 is uniformly electrostatically charged by the charging device, not shown, based on the scan by the optical deflecting device 1004 and rotation of the drum-shaped photosensitive member 1006, a pattern of light is formed on the surface of the drum photosensitive member 1006. In this way, an electrostatic latent image is formed on the surface of the drum-shaped photosensitive member 1006. Furthermore, a toner image of the pattern corresponding to the electrostatic latent image is formed on the surface of drum-shaped photosensitive member 1006 by a developing device, not illustrated. By transferring it to a paper sheet, not illustrated, and fixing the same, a visible image is produced.

By incorporating the optical deflecting device according to any of the embodiments described above into an image forming apparatus of this embodiment, crosswise oblique incidence of light is assured. More specifically, a light source 1001 is disposed so that light is incident on the reflection surface of the second movable element from the direction of the void-side of the first movable element of the optical deflecting device 1004, such that light 1003 from the light source 1001 is deflected by the optical deflecting device 1004, and at least a portion of this light is incident on the photosensitive member 1006. As a result of this, use of a half mirror becomes unnecessary, and cost reduction and downsizing are enabled.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-237261 filed Sep. 1, 2006, for which is hereby incorporated by reference.

What is claimed is:

1. An optical deflecting device, comprising:
a supporting member;
an oscillating member; and
a driving member for driving said oscillating member, wherein said oscillating member includes a first movable element and a second movable element torsionally oscillating about a common torsion axis, a first torsion spring for coupling said first movable element and said supporting member with each other, and a second torsion spring for coupling said first and second movable elements with each other and having a torsion axis the same as said first torsion spring, and
wherein said first movable element is formed with a void configured to avoid blocking of incident light being incident on said second movable element from a direction intersecting with said torsion axis.

2. An optical deflecting device according to claim 1, wherein said first movable element has a polygonal-frame-like shape having at least one portion extending in parallel to said torsion axis, and wherein said void is formed by partly removing the portion of said first movable element extending in parallel to said torsion axis.

3. An optical deflecting device according to claim 1, wherein said first movable element is supported by said supporting member through a plurality of said first torsion springs disposed opposed to each other while said first movable element is sandwiched therebetween, and wherein said second movable element is supported by said first movable element through a plurality of said second torsion springs disposed opposed to each other while said second movable element is sandwiched therebetween.

4. An optical deflecting device according to claim 1, wherein, with reference to a plane extending through said torsion axis and being perpendicular to said second movable element as the same is stationary, inertia moments at the opposite sides of said first movable element are equalized.

5. An optical deflecting device according to claim 1, further comprising a weight provided at one side of said first movable element with respect to a plane extending through said torsion axis and being perpendicular to said second movable element as the same is stationary, at which side said void is formed.

6. An optical deflecting device according to claim 1, wherein, with respect to said torsion axis, said oscillating member has a primary natural oscillation mode that provides a reference frequency and a secondary natural oscillation mode that provides a frequency which is twofold the reference frequency, and wherein said driving member drives said oscillating member in accordance with the reference frequency and the twofold frequency.

7. An image forming apparatus, comprising:
a light source;
an optical deflecting device including (i) a supporting member, (ii) an oscillating member and (iii) a driving member for driving said oscillating member, wherein said oscillating member includes a first movable element and a second movable element torsionally oscillating about a common torsion axis, a first torsion spring for coupling said first movable element and said supporting member with each other, and a second torsion spring for coupling said first and second movable elements with each other and having a torsion axis the same as said first torsion spring, and wherein said first movable element is formed with a void configured to avoid blocking of incident light being incident on said second movable element from a direction intersecting with said torsion axis; and
a photosensitive member,
wherein said light source is so disposed that light is incident on a reflection surface of said second movable element, from a side where said void of said first movable element is present, and wherein said optical deflecting device deflects the light from said light source so that at least a portion of the light is incident on said photosensitive member thereby to produce an electrostatic latent image on said photosensitive member.

8. An optical deflecting device, comprising:

a supporting member;

an oscillating member; and a driving member for driving said oscillating member, wherein said oscillating member includes a first movable element and a second movable element torsionally oscillating about a single torsion axis, a first torsion spring for coupling said first movable element and said supporting member with each other, and a second torsion spring for coupling said first and second movable elements with each other, wherein said first torsion spring and said second torsion spring are disposed along a single straight line, and wherein said first movable element is formed with one of (i) a void which extends from a side near said torsion axis to a side remote from said torsion axis and totally penetrates a material of said first movable element to define a apace and (ii) a void which defines a space while leaving there a part of the material at the side remote from said torsion axis, said first movable element being disposed to surround said second movable element.

9. An optical deflecting device according to claim 8, wherein said first movable element has a polygonal-frame-like shape having at least one portion extending in parallel to said torsion axis, and wherein said void is formed by partly removing the portion of said first movable element extending in parallel to said torsion axis.

* * * * *